(12) United States Patent
Sacks

(10) Patent No.: US 7,056,050 B2
(45) Date of Patent: Jun. 6, 2006

(54) ADVANCED DATA CONTROLLED CLEANING SYSTEM

(75) Inventor: Roland Sacks, Bubikon (CH)

(73) Assignee: Avet, AG (CH)

( * ) Notice: Subject to any disclaimer, the term of this patent is extended or adjusted under 35 U.S.C. 154(b) by 0 days.

(21) Appl. No.: 10/906,532

(22) Filed: Feb. 23, 2005

(65) Prior Publication Data
US 2005/0186015 A1 Aug. 25, 2005

Related U.S. Application Data

(60) Provisional application No. 60/521,137, filed on Feb. 24, 2004.

(51) Int. Cl.
*A47L 13/26* (2006.01)
*A47L 13/30* (2006.01)

(52) U.S. Cl. ............... 401/139; 401/138; 401/195

(58) Field of Classification Search ........ 401/137–139, 401/195, 261, 265, 266, 268, 270, 284, 292
See application file for complete search history.

(56) References Cited

U.S. PATENT DOCUMENTS 6,048,123 A * 4/2000 Holt et al. ................ 401/139
6,663,306 B1 * 12/2003 Policicchio et al. ......... 401/138
6,669,391 B1 * 12/2003 Policicchio et al. ......... 401/139
6,964,535 B1 * 11/2005 Bell et al. ................... 401/138

* cited by examiner

*Primary Examiner*—Tuan Nguyen
(74) *Attorney, Agent, or Firm*—M. K. Silverman; Yi Li; John C. Smith

(57) ABSTRACT

An advanced data controlled cleaning system that consists of cleaning tools, cleaning mops and information-technology (IT) solutions. The system uses sensors to detect the presence of a cleaning mop in a room. The sensors communicate with an IT system which monitors the rooms in which the cleaning mop is used, the time that the cleaning mop entered the room, and the length of time that the cleaning mop remained in the room. The cleaning mop includes a motion sensor to monitor how often the mop head is swept back and forth across the floor. This motion information is used to ensure that the proper amount of work is performed in each room. The system also ensures that the mophead is itself cleaned at the proper time by counting the number of times the mophead is swept across the floor. The system provides cleaning fluid to the mophead based on usage, and stops application of cleaning fluid when the mophead itself requires service.

2 Claims, 3 Drawing Sheets

ADVANCED DATA CONTROLLED CLEANING SYSTEM

CROSS-REFERENCE TO RELATED APPLICATIONS

This application is related to, and claims the benefit of, the provisional patent application entitled "Advanced Data Controlled Cleaning System", filed Feb. 24, 2004, bearing U.S. Ser. No. 60/521,137, and naming Roland Sacks, the named inventor herein, as sole inventor, the contents of which is specifically incorporated by reference herein in its entirety.

BACKGROUND OF INVENTION

1. Technical Field

The present invention relates to cleaning systems. In particular, it relates to a cleaning system that improves cleaning efficiency by determining when disposable components are to be replaced, and by monitoring work activity.

2. Background

A variety of basic cleaning tools are used to clean surfaces such as floors. These cleaning tools include conventional mopheads and the more recently developed flat mopheads ("flat mops"). These prior art devices rely on the thoroughness of the user to ensure that the cleaning was properly done. In particular, the user determines how much work is done for a given room, and when the cleaning device itself needs servicing (i.e., when the mop head should be washed, or when the disposable flat mop that should be replaced. It would be desirable to have a cleaning system which automatically monitors a user's activity to insure that the proper amount of work is performed, and to ensure that the mophead is cleaned or replaced at the appropriate time.

SUMMARY OF INVENTION

The present invention provides an Advanced Data Controlled Cleaning System (ADCCS). The ADCCS is a system that consists of cleaning tools, cleaning mops and information-technology (IT) solutions. The ADCCS system uses sensors to detect the presence of a cleaning mop in a room. The sensors communicate with an IT system which monitors the rooms in which the cleaning mop is used. In addition, the IT system also monitors the time that the cleaning mop entered the room, as well as the length of time that the cleaning mop remained in the room.

The cleaning mop also includes a motion sensor to monitor how often the mop head is swept back and forth across the floor. This motion information is also monitored by the IT system to ensure that the proper amount of work is performed in each room. The system also ensures that the mophead is itself cleaned at the proper time by counting the number of times the mophead is swept across the floor. The system provides cleaning fluid to the mophead based on usage, and stops application of cleaning fluid when the mophead itself requires service.

DETAILED DESCRIPTION

Figure 1:
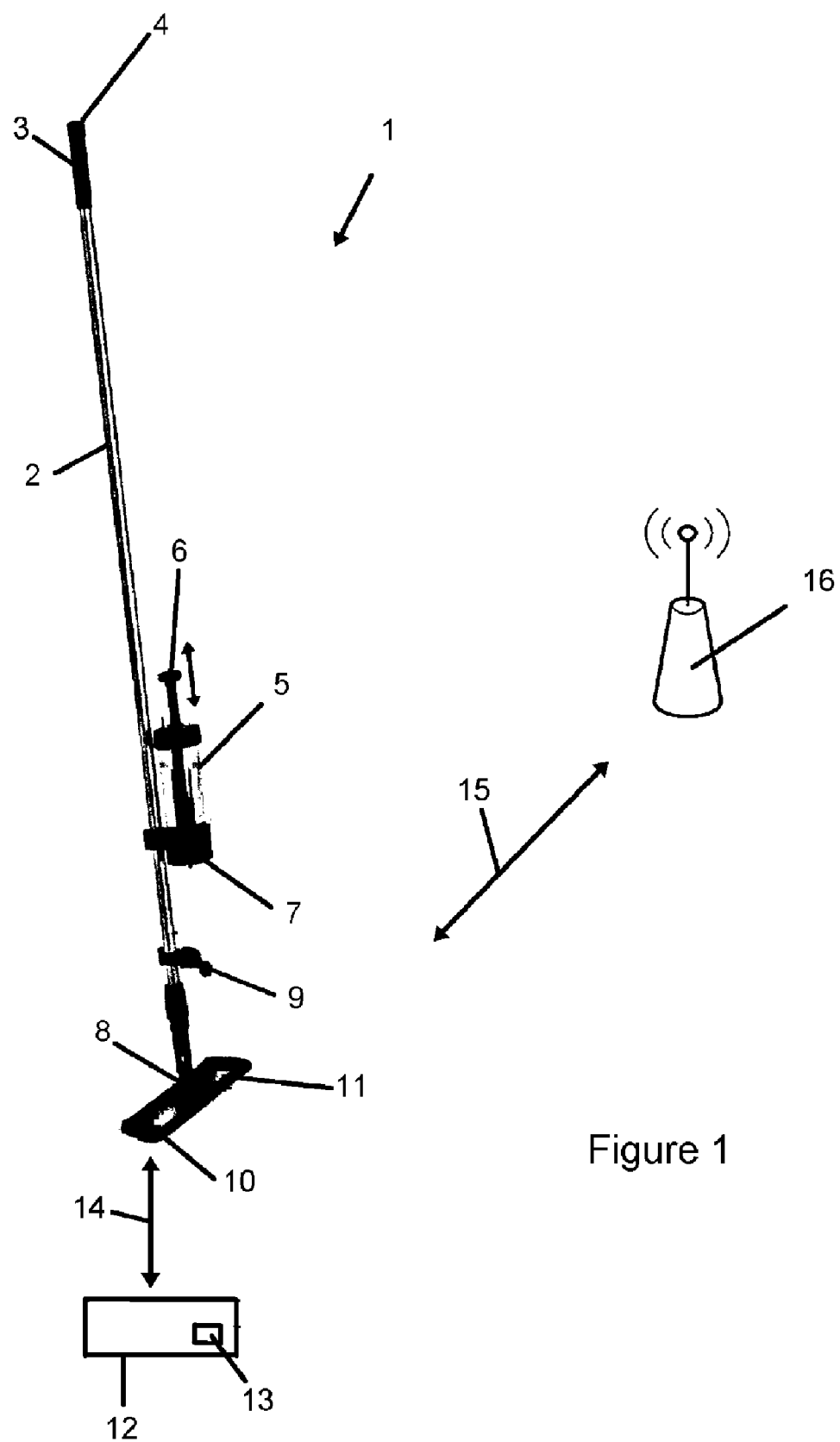
FIG. 1 illustrates a perspective view of a preferred embodiment of the intelligent cleaning mop used by the ADCCS system.

The ADCCS provides a novel system for cleaning surfaces. The system uses advanced IT functions to monitor and control cleaning efficiency. By ensuring that cleaning efficiency is improved, the system makes it possible to prevent transmission of bacteria, viruses or other contaminants. In facilities such as hospitals, a substantial number of patients and staff are exposed to a variety of infectious agents. By improving cleaning efficiency, and ensuring that each room is properly cleaned, the ADCCS makes a substantial and measurable contribution to the fight against hospital generated illnesses. In addition to providing a safer environment for individuals in the hospital environment, the ADCCS also reduces liability risks by reducing the possibility of infection due to the transmission of bacteria, viruses or other contaminants to individuals in the hospital.

The ADCCS has several components. A primary component is an intelligent flat mop. The flat mop has an implanted chip, which performs two primary functions: First, it provides a unique ID which allows each flat mop in a facility to be identified by an IT system.

Second, it incorporates motion sensing technology which allows the flat mop to monitor cleaning cycles by counting the amount of times that the flat mop is swiped across the floor. The motion information can be used by the ADCCS to determine when the mophead requires extra cleaning fluid, when the mophead itself should be cleaned, or when the mophead should be replaced. Of course, it also allows the system to monitor when the cleaning work was done and where it was done to ensure that the facility was properly cleaned.

In the preferred embodiment, the motion sensing is accomplished by an oscillation gauge. Oscillation gauges are well-known in the art and do not have to be further described herein. The oscillation gauge ensures that the room has been thoroughly cleaned. For example, by means of the oscillation gauge, a Target/Actual comparison can be made. The number of swipes required to clean a given room can be defined as the Target. Deviations within a certain tolerance will be permissible. Too many oscillations (i.e. swipes across the floor) means that somebody worked too much. While this does not impair cleanliness, it wastes the user's time which results in excessive labor costs. On the other hand, too few oscillations means that the room has not been cleaned thoroughly. This leads to an increased danger to patients and workers due to transmission of bacteria, viruses or other contaminants. In this situation, there is an increased liability exposure for the company. This is a serious problem in environments such as a hospital, where many people die each year as a result of infections acquired in the hospital.

In the preferred embodiment, the oscillation gauge is also used to control distribution of cleaning fluids. The cleaning fluids are sprayed from the reservoir onto the cleaning surface during the normal course of use. After a predetermined number of oscillations the spraying will be interrupted, because the flat mop requires the mophead to be cleaned or replaced. Once the cleaning or replacement is accomplished, the spray mechanism is re-enabled. Those skilled in the art will recognize that the ADCCS can be structured such that the mophead replacement can be controlled from the IT system, or controlled locally at the flat mop. Optionally, the number of oscillations can be adjusted on the flat mop, or remotely from the IT system. Further, in addition to controlling spraying based on oscillation count, the device can also be structured to require a new mophead in each room. This may be especially valuable in situations where highly infectious diseases are being treated.

In addition to monitoring cleaning performance, the IT system can also be used to control replacement of individual mopheads on a scheduled basis. For example, each mophead can have its own unique identification code, in the form of an RFID tag or other suitable device, which can be used to monitor how long a particular mophead has been used. The system can then notify the user to replace the mophead. To insure quality, the unique identification code can be used to allow only mopheads having a particular level of quality to work with the system.

In contrast to a conventional mop, the intelligent flat mop provided by this invention requires a power supply to power its integral circuits. In the preferred embodiment, the power supply is a battery, which is preferably rechargeable. The recharger mechanism can be integrated into the flat mop, or be an external unit which recharges removable batteries. Those skilled in the art will recognize that the mop can also be powered by an external cord attached to a wall outlet.

The preferred embodiment of the flat mop also takes into account ergonomic factors. For example, a telescopic handle is used on the preferred embodiment to accommodate varying heights of users. In the preferred embodiment, the flat mop has an adjustable length of 120 cm–160 cm (47"–63"). However, those skilled in the art will recognize that the length of the flat mop is not critical and can vary. The flat mop in the preferred embodiment also has a swivel at the distal end of the flat mop to accommodate movement of the flat mop when cleaning various parts of a room. This also assists the user when the user is attempting to achieve the maximum oscillation during use. The handle of the flat mop is at the flat mop's proximal end. The handle is intended to be designed such that it is possible for the user to comfortably work for long periods without getting tired.

Spray initiation is also controlled from the flat mop. Spray initiation can be controlled by a manual pump, an air (or gas) pressurized pump, or an electrical pump. The spray initiation preferably requires a small amount of pressure or tension by the user's hands or fingers to start. In the preferred embodiment, the flat mop also includes a locking device that locks the sprayer in the open position to allow larger amounts to be sprayed. Likewise, the preferred embodiment also provides for adjustable dosage. By being able to adjust the dosage, the amount of chemicals used can be more precisely controlled to suit a particular circumstance.

Third, the ADCCS also includes a timing system that allows the ADCCS to monitor the time the mophead enters and exits a particular room, and the amount of time the mophead was used in a particular room.

The preferred embodiment of the flat mop includes an integral reservoir for holding cleaning solution. The flat mop is further designed such that the reservoir will only release cleaning solution if a flat mop is attached and has not exceeded its allowed cleaning cycle usage levels. In the preferred embodiment, after the flat mop has been washed 350 times, the release of the cleaning solution will be stopped, the old mophead must be discarded, and a new mophead must be installed on the flat mop. By so doing, the system ensures that the flat mop is using a mophead that is capable of proper levels of absorption. Those skilled in the art will recognize that while the preferred embodiment uses a 350 oscillations cycle for the mophead, this number is not critical and can vary base on the needs of a particular environment.

In the preferred embodiment, the cleaning solution used by the ADCCS includes antibacterial agents. These antibacterial agents reduce the possibility of patient or employee infections which can result from increased bacteria in rooms which are not properly cleaned.

Another important component of the ADCCS is the information technology ("IT") system. The IT system allows multiple flat mops in a large facility to be simultaneously monitored from a single location. By monitoring usage of individual flat mops, the IT system can determine when flat mops require servicing, and whether or not every room in the facility has been properly cleaned. In addition, the IT system can monitor the performance of cleaning personnel by associating particular flat mops with particular individuals. This allows the ADCCS to measure individual performance on an ongoing basis. In the preferred embodiment, the worker has to identify him/herself by Login and Logout on the tool. This can be accomplished by a variety of means. For example, the worker can use an ID card to activate the flat mop when the worker enters the room. This can be done via an RFID tag, a barcode, by entering a code into a keypad, or any other suitable means of identification. Likewise, the identification device can also be embedded in the flat mop such that it automatically activates when it enters the room. This allows the ADCCS to monitor which individual is working with the tool, where that individual is working with the tool, and when that individual is working with the tool.

Those skilled in the art will recognize that the IT system can be controlled in a variety of ways, such as through hard wiring, software, etc. In the preferred embodiment, the IT system is preferably controlled by software, and the individual mops are preferably in communication with the IT system via wireless transmission. The software is preferably capable of performing multiple functions. For example, it should be able to execute some or all of the following functions:

a) Run evaluations of the usage of each of the tools.
b) Enter evaluations about the used mops.
c) Collect data on the usage by person, or by flat mop, for each room/area to be cleaned.
d) Run target/actual comparisons.
e) Calculate cleaning efficiency.
f) Provide evidence for actual cleaning efficiency (quality control).
g) Maintain records regarding flat mop usage and automatically control inventory and the reordering process.
h) Communicate via a link to the internet, where multiple locations in a large company can upload or download additional data to the company headquarters where additional data evaluations may be made to reflect usage throughout the company.

To this point, we have discussed the ADCCS in terms of its use in a hospital environment. However those skilled in the art will recognize that this system provides substantial benefits to any environment which requires a high level of controllable cleanliness.

Having discussed the features and advantages of the invention in general, we turn now to a more detailed discussion of the figures.

FIG. 1 illustrates a perspective view of a preferred embodiment of the intelligent cleaning mop 1 used by the ADCCS system. As shown in this figure, the central support structure of the intelligent cleaning mop 1 is a support shaft 2. At the upper end of the support shaft 2 is handle 3 which is grasped by the cleaning person during use. Also shown is button 4 which is located in the handle 3. Button 4 is used to control release of cleaning fluids from reservoir 5. This can be accomplished by any suitable means. For example, button 4 can be attached to a mechanical linkage which controls valve at the proximal end of the intelligent cleaning mop 1. Alternatively, it can be controlled electronically by a solenoid (not shown) which is activated by button 4. Numerous methods of controlling valves are well known in the art. As a result, any suitable method can be used.

When the valve is activated by button 4, cleaning solution is sprayed under pressure from reservoir 5. The spray is ejected onto the surface in front of the mop head 8. As a result, the cleaning person can control when and where cleaning solution is sprayed.

The reservoir 5 which holds cleaning solution can be pressurized in several ways. It can use an optional manual pump 6, which is illustrated in this figure. Alternatively, pressure can be provided by a powered pump (not shown). Pumps are well-known in the art. A powered pump would preferably be powered by batteries 7 stored within reservoir 5.

At the distal end of the intelligent cleaning mop 1 is the mop head 8. In the preferred embodiment, mophead 8 is an intelligent device. It contains a motion sensor 11 which detects and counts the number of swipes made by the mophead 8. This information is input to a controller 10. Controller 10 communicates via wireless link 15 to a monitoring station 16 which in turn communicates with a central computer facility 18 (shown below in FIG. 2). As a result of this communications link, the central computer facility 18 can monitor multiple intelligent cleaning mops 1 in locations spread throughout a facility. It can tell if individual rooms have been cleaned on a timely basis, it can tell if an individual worker is wasting time by cleaning too much, or it can tell if a worker is not spending enough time cleaning a room. The information gathered by the ADCCS can be used to evaluate worker performance, and more important, it can be used to ensure that a facility is properly cleaned on a timely basis.

Also shown in this figure is cleaning pad 12. For ease of illustration, cleaning pad 12 shown is detached from mophead 8. Cleaning pad 12 is detachably secured to mophead 8 during use. It is intended to be attached for cleaning or replacement purposes at appropriate times. Cleaning pad 12 can be fabricated from any suitable material which is compatible with the particular floor or surface being cleaned, and compatible with the particular cleaning fluids being used.

Also shown in this figure is wireless link 14 that allows microchip 13 to communicate with controller 10. While it is possible to use a hard wired connection, the preferred embodiment envisions a wireless link, embedded in the cleaning pad 12 which will be invisible to the user. The wireless link 14 can take any suitable form, and can communicate with any convenient technology, such as RF, magnetic or passive means. For ease of discussion, the term microchip 13 is used. However, those skilled in the art will recognize that it can be implemented by simple devices such as RFID tags, or more intelligent microchips can be used to communicate information between the controller 10 and microchip 13.

In the preferred embodiment, each cleaning pad 12 will have a unique ID associated with it. This allows the controller tend to identify and recognize cleaning pads 12. This allows the ADCCS system to control what types of cleaning pads 12 are used with a particular mophead 8. This provides two major benefits: it ensures that only cleaning pads 12 which have a predetermined quality level are used, and it ensures that cleaning pads 12 are replaced on a timely basis. One method of ensuring that this happens is to program the controller 10 such that it can turn off valve in the event that a defective or worn out cleaning pad 12 is used. In a preferred embodiment of the invention, the sprayer is disabled under these conditions until a new cleaning pad 12 is installed. This can be controlled from the controller 10 inside the intelligent cleaning mop 1, or remotely controlled from the computer 18.

Also shown in this figure is monitoring station 16, which is not part of intelligent cleaning mop 1. In the preferred embodiment, monitoring stations 16 are distributed throughout a facility, and act as a relay points for the computer 18. By using low-power monitoring stations 16, the system can be implemented without causing interference with other communication or data systems.

Figure 2:
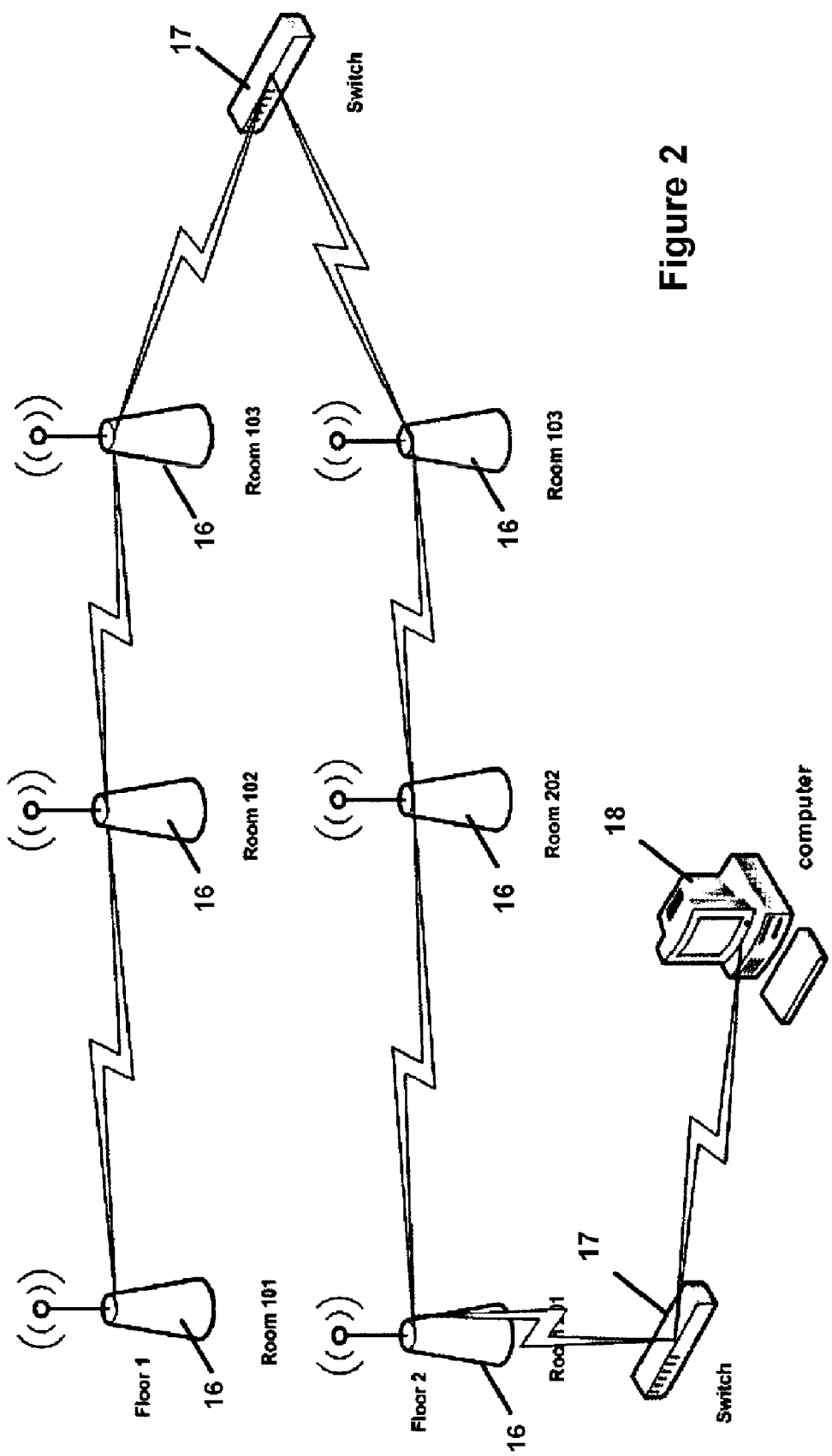
FIG. 2 is a diagram that illustrates a preferred embodiment of the communication and control links utilized by the ADCCS system.

FIG. 2 is a diagram that illustrates a preferred embodiment of the communication and control links utilized by the ADCCS system. In this figure, a plurality of monitoring station 16 are shown in remote rooms and locations throughout a facility. Also shown in this figure are switches 17 which act as communication points for the various monitoring stations 16. In the preferred embodiments, the monitoring stations 16 can communicate directly with the switch 17, or can be daisy chained to facilitate low-power transmission over wide physical areas. This figure illustrates the data being accumulated by the switches 17 and then transmitted to computer 18. However those skilled in the art will recognize that as long as there is suitable signal strength, the monitoring stations 16 could also be used to communicate directly with the computer 18. In fact, in a small physical facility, the switches 17 may be eliminated entirely.

In some cases, where an organization's facilities are spread over wide geographic areas, each computer 18 at a given facility can communicate with a central computer in a remote location. This will allow a company to monitor work being performed across the country, or around the world. In this situation, the local computer 18 at each facility would communicate with the central computer or mainframe at company headquarters.

Figure 3:
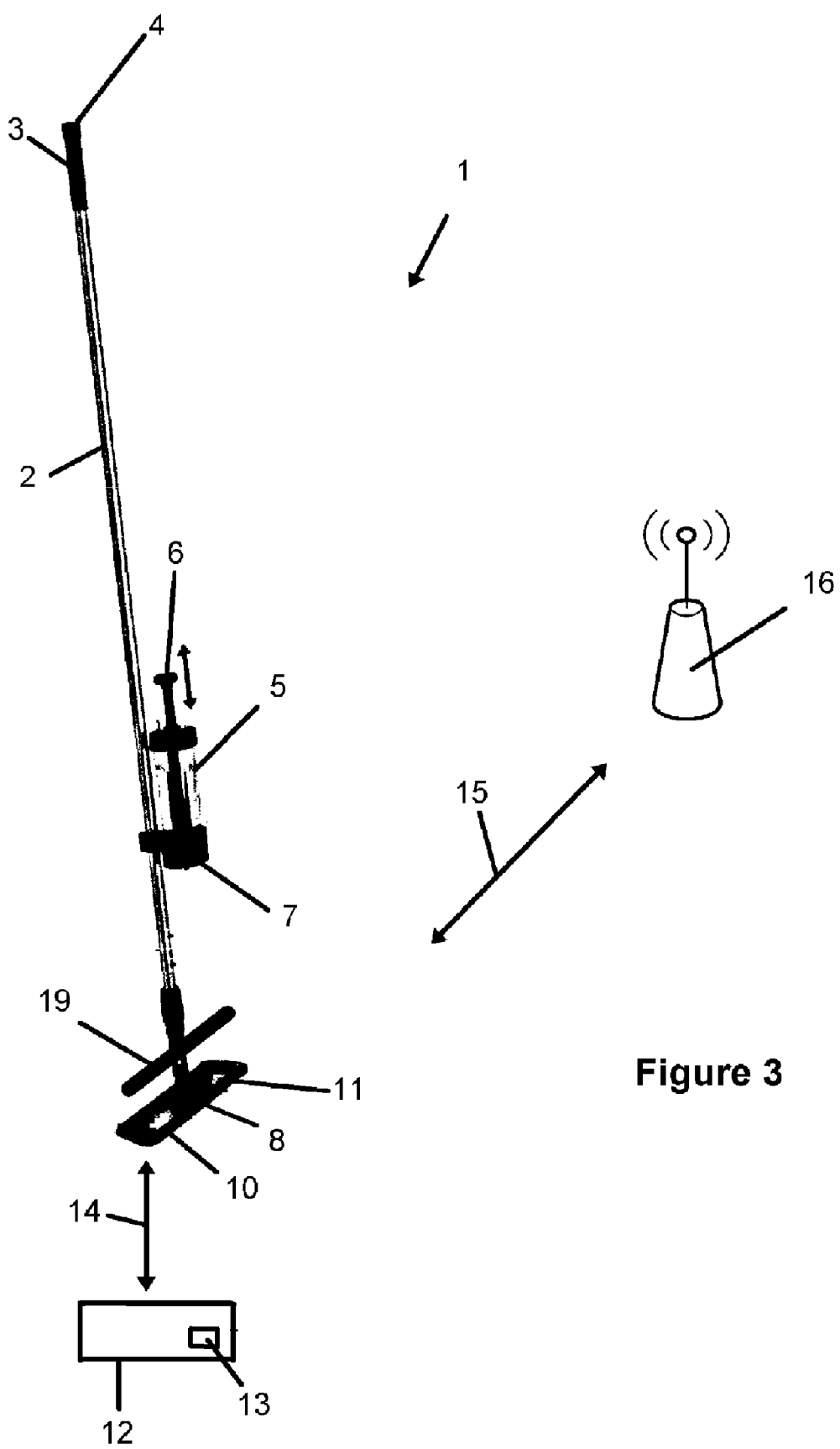
FIG. 3 is a perspective view of a preferred embodiment of intelligent cleaning mop that uses a spray bar in place of the sprayer shown in FIG. 1.

FIG. 3 is a perspective view of an alternative preferred embodiment of intelligent cleaning mop that uses a spray bar 19 in place of the sprayer 9 shown in FIG. 1. While the sprayer 9 used by the previous embodiments produced a single spray string, the spray bar 19 sprays multiple streams across a wider horizontal area. Depending on the nature of liquids being spread across a surface, simultaneous application of fluid to a wide surface area may be desirable.

While the invention has been described with respect to a preferred embodiment thereof, it will be understood by those skilled in the art that various changes in detail may be made therein without departing from the spirit, scope, and teaching of the invention.

I claim:

1. An advanced data controlled cleaning system, comprising:
    an intelligent flat mop comprising:
    a replaceable mophead;
    a reservoir for storing cleaning fluid;
    a sprayer for spraying the cleaning fluid from the reservoir;
    means to count the number of times the mophead oscillates; and
    means to deactivate the sprayer when a predetermined number of oscillations is reached.

2. The system, as in claim 1, further comprising an IT system, the IT system having means to communicate with the intelligent flat mop.

* * * * *